(12) United States Patent
Jamail et al.

(10) Patent No.: US 10,430,103 B1
(45) Date of Patent: Oct. 1, 2019

(54) USING LOG OBJECTS IN OBJECT STORAGE FOR DURABILITY OF FILE OBJECTS IN VOLATILE MEMORY

(71) Applicant: Amazon Technologies, Inc., Seattle, WA (US)

(72) Inventors: John Jamail, Sudbury, MA (US); Wayne Mesard, Belmont, MA (US); Ian Marshal Wharton, Somerville, MA (US)

(73) Assignee: Amazon Technologies, Inc., Seattle, WA (US)

( * ) Notice: Subject to any disclaimer, the term of this patent is extended or adjusted under 35 U.S.C. 154(b) by 80 days.

(21) Appl. No.: 15/464,305

(22) Filed: Mar. 20, 2017

(51) Int. Cl.
  *G06F 12/00* (2006.01)
  *G06F 13/00* (2006.01)
  *G06F 13/28* (2006.01)
  *G06F 3/06* (2006.01)

(52) U.S. Cl.
  CPC ............ *G06F 3/0643* (2013.01); *G06F 3/067* (2013.01); *G06F 3/0619* (2013.01); *G06F 3/0652* (2013.01); *G06F 3/0656* (2013.01); *G06F 3/0667* (2013.01)

(58) Field of Classification Search
  CPC ..... G06F 3/0643; G06F 3/0652; G06F 3/0667
  USPC ........................................................ 711/165
  See application file for complete search history.

(56) References Cited

U.S. PATENT DOCUMENTS

| 8,478,799 | B2 | 7/2013 | Beaverson et al. |
| 8,732,386 | B2 | 5/2014 | O'Krafka et al. |
| 2002/0078174 | A1* | 6/2002 | Sim ................... G06F 17/30194 709/219 |
| 2007/0103984 | A1* | 5/2007 | Kavuri ................. G06F 3/0605 365/185.17 |
| 2009/0089481 | A1* | 4/2009 | Kapoor ............... G06F 12/0246 711/103 |
| 2015/0277794 | A1* | 10/2015 | Tudor ................... G06F 3/0619 711/103 |
| 2015/0310054 | A1* | 10/2015 | Passey .............. G06F 17/30221 707/703 |

OTHER PUBLICATIONS

Paul Randal, Choosing Default Sizes for Your Data and Log Files, Dec. 13, 2010, ITPro Today (Year: 2010).*

* cited by examiner

*Primary Examiner* — Edward J Dudek, Jr.
*Assistant Examiner* — Sidney Li
(74) *Attorney, Agent, or Firm* — Robert C. Kowert; Meyertons, Hood, Kivlin, Kowert & Goetzel, P.C.

(57) ABSTRACT

A file system interface receives, from one or more clients, file system operations over a network. In response to receiving a file system operation for a file, a file-object manager calls an object storage interface to store, via an application-level network protocol, a log object indicating the file system operation into a file system log in the object storage system and creates or updates a file object in a file object construction buffer in volatile system memory. To evict the file object, the file-object manager calls the object storage interface to store the file object into a file object store in the object storage system. The file-object manager does not have access to local persistent storage. After power failure, the file-object manager calls the object storage interface to retrieve log objects from the file system log and replays file system operations to restore file objects in the volatile system memory.

20 Claims, 11 Drawing Sheets

USING LOG OBJECTS IN OBJECT STORAGE FOR DURABILITY OF FILE OBJECTS IN VOLATILE MEMORY

BACKGROUND

The demand for data storage capacity for computer systems has led to the development of a variety of storage devices and storage services. Information may be stored using different formats and sometimes may be accessed by different clients via a network. Many computer systems implement file system-based storage, in which data is stored in different files in different directories of the file system. A storage device or a storage service may offer different clients the ability to access a single shared folder using a file system protocol, such as network file system (NFS). Block-based storage and object-based storage are other examples of techniques for storing data.

In some cases, a service provider may provide a remote storage service to clients to store client data (e.g., via an internet connection). However, for various reasons, a client may decide to store some of their data or all of their data on-site. In some cases, a service provider may provide software for use on-site that has the same or similar functionality as software at the remote storage service. Thus, a client may use the same or similar storage interface and storage service to access and store data on-site using deices within the client's local network.

When a client stores data to a storage device, the data may be processed, altered, or changed to a different format by the storage device (or an intermediary device) before the data is stored to the storage device in the new format. For example, when a client sends file system writes to store data or update data on a storage device, the data for file system writes may be processed in a memory of the storage device into a particular data format and then sent to a persistent storage area (e.g., a hard disk, tape, etc.) for storage. However, if the storage device experiences a power failure, the data in the memory may be lost and the client may need to re-send file system writes to the storage device.

Figure 1:
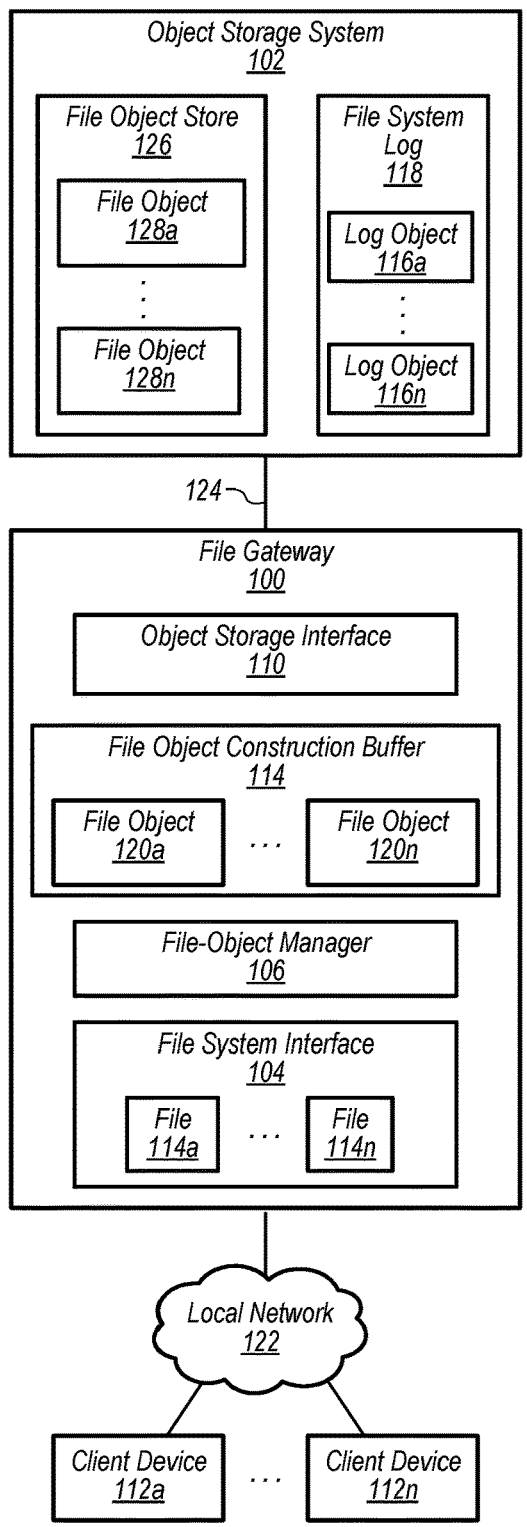
FIG. 1 illustrates a system for using a file system log in an object storage system to provide durability of file objects in volatile system memory, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement log objects in an object storage system to provide durability of file objects in volatile system memory. A file gateway may include a file system interface, a file-object manager, a file object construction buffer, and an object storage interface. The file system interface may receive, from one or more clients over a network, file system operations for one or more files. In embodiments, in response to receiving a file system operation for a file, the file-object manager calls the object storage interface to store a log object indicating the file system operation into a file system log in the object storage system and creates or updates a file object in a file object construction buffer in the volatile system memory, wherein the file object corresponds to the file.

In some embodiments, in response to a determination to evict the file object, the file-object manager calls the object storage interface to store the file object into a file object store in the object storage system. In embodiments, the file-object manager does not have access to local persistent storage. In some embodiments, a different object storage interface and/or object storage system may be used between file objects and log objects. For example, the file-object manager may call the same or a different object storage interface to store a file object or a log object to the same or different object storage system.

If a power failure causes loss of content of the volatile system memory (e.g., file objects, the file gateway, or one or more components of the file gateway), the file-object manager may call the object storage interface to retrieve one or more log objects from the file system log of the object storage system and replay one or more file system operations indicated by the one or more log objects to restore one or more file objects in the volatile system memory. In some embodiments, during replay of the one or more file system operations, the file-object manager may call the object storage interface to retrieve one or more file objects from the file object store of the object storage system and load them into the object construction buffer of the volatile memory.

Techniques for implementing a file system log in an object storage system may provide improved durability for file objects in volatile system memory by using the file system log to restore file objects in volatile system memory that were lost due to a power failure, reboot, or other event. Thus, the durability of file system operations, such as file system writes, is improved. Therefore, there is no need for a client to resend file system operations to restore lost file objects, which may reduce the usage of computing resources (e.g., processors, memory, network devices, storage devices, etc.) and reduce network bandwidth usage for the client as well as for computing resources implementing the file gateway. Moreover, restoring the lost file objects in volatile system memory based on the file system log may be faster, more efficient, and have fewer errors than other techniques, such as resending file system operations to the file gateway. In embodiments, the techniques may be useful when the file-object manager and/or one or more other components of the file gateway have no access or limited access to local persistent storage, yet improved durability for file system writes is desired.

FIG. 1 illustrates a system for using a file system log in an object storage system to provide durability of file objects in volatile system memory, according to some embodiments. The file gateway 100, the object storage system 102, and any other devices/components depicted in FIG. 1 may be the same (or have one or more of the same components) as the file gateway 100 and the object storage system 102 depicted in FIGS. 2-9, in embodiments. Similarly, each of the file gateways 100, object storage systems 102, and any other devices/components depicted in any of FIGS. 2-9 may be the same (or have one or more of the same components) as the file gateway 100 and the object storage 102 system depicted in FIG. 1.

In the depicted embodiment, the file gateway 100 includes a file system interface 104, a file-object manager 106, a file object construction buffer 108, and an object storage interface 110. The file system interface 104 may receive, from one or more clients 112, file system operations to one or more files 114. In embodiments, in response to receiving a file system operation for a file 114, the file-object manager 106 may call, via an application-level network protocol, the object storage interface 110 to store a log object 116 indicating the file system operation into a file system log 118 in the object storage system 102 and may create or update a file object 120 in a file object construction buffer 108 in the volatile system memory, wherein the file object 116 corresponds to the file 114. In embodiments, the file-object manager may create a new file object 120 in response to receiving, by the file system interface, a file system operation to open or create a new file (e.g., there was no corresponding file object because the file is a new file to be created).

In embodiments, the object storage interface 110 stores data objects (e.g., file objects, log objects, etc.) to the object storage system 102 and/or retrieves data objects from the object storage system 102 via an application-level network protocol (e.g., hyper-text transfer protocol (HTTP), or any other application layer protocol used for internet or network communication). Thus, the object storage system 102 may be within a same physical device and/or or enclosure (e.g., a network attached storage device or shippable storage device) as the file gateway or the object storage system 102 may be in a separate physical device and/or enclosure than the file gateway (e.g. another location of a data center or different data center).

In embodiments, the object storage interface 110 stores and retrieves data objects in the above manner, as opposed to storing or retrieving data via an operating-system level storage interface or kernel-level storage interface because the file gateway 100 and/or the file-object manager 106 does not have access to local persistent storage (e.g., hard disks, etc.). In some embodiments, the object storage interface 110 stores and retrieves data objects to and from the object storage system via an application programming interface (API), which in some instances may be a representational state transfer API (e.g., a REST-based API).

In embodiments, each of the file objects 120a-120n corresponds to a respective file 114a-114n. In various embodiments, the files 114 may be a file in a file system (e.g., network file system) of or associated with the file system interface, or the files 114 may be any other suitable data structure for storing data and/or metadata of a file that can be accessed by the file system interface and/or one or more of the client devices 112.

In embodiments, the file gateway 100 may receive file system operations from clients 112 via a local area network 122. In some embodiments, the file gateway 100 may receive file system operations from at least some of the clients 112 via a wide area network (e.g., the Internet). Thus, in some embodiments, the local area network 122 may instead be a wide area network. Furthermore, in various embodiments, the file gateway 100 or at least one or more components of the file gateway (e.g., the file-object manager 106, buffer 108, etc.) does not have access to local persistent storage. In an embodiment, file gateway 100 or one or more components of the file gateway 100 (e.g., the object storage interface 110) sends data objects to and receives data objects from the object storage system 102 via a network interface and/or network connection 124.

In embodiments, in response to a determination by the file-object manager 106 to evict a file object 120, the file-object manager 106 calls the object storage interface 110 to store the file object 120 into a file object store 126 in the object storage system 102. In some embodiments, a different object storage interface and/or object storage system may be used for file objects as opposed to log objects. For example, the file-object manager 106 may call the same or a different object storage interface to store a file object or a log object to the same or different object storage system.

If a power failure causes loss of content of the volatile system memory (e.g., file objects, the file gateway, or one or more components of the file gateway), the file-object manager 106 may call the object storage interface 102 to retrieve one or more log objects 116 from the file system log 118 of the object storage system 102 and replay one or more file system operations indicated by the one or more log objects 116 to restore one or more file objects 120 in the volatile system memory. In some embodiments, during replay of the one or more file system operations, the file-object manager 106 may call the object storage interface 110 to retrieve one or more file objects 128 from the file object store 126 of the object storage system 102 and load them into the object construction buffer 108 of the volatile memory. In embodiments, after the replaying of the file system operations, the file objects 120 in the file object construction buffer 108 are restored and the file gateway 100 may begin to receive and process additional file system operations from the one or more clients 112.

In some embodiments, the file object construction buffer 108 and/or one or more other components of the file gateway 100 may be implemented as a ram disk (ram drive, virtual RAM drive, software RAM drive, etc.). Thus, in embodiments, the file object construction buffer may be a block of file system memory that the file gateway uses (e.g., accesses, addresses, etc.) as if it were a disk drive.

In embodiments, the object storage system stores data objects using a key-value storage scheme. For example, a file object or a log object may be stored as a value (e.g., block of continuous data) and an associated key (e.g. identifier) that can be used to locate or reference the object. Thus, the object storage system may use key-value object storage, as opposed to other types of storage schemes (e.g., block-based storage or file system storage).

In an embodiment, the file system log 118 is implemented as a circular log. In embodiments, the size of the circular log may be at least a threshold size that is capable of storing at least a minimum amount of data and/or metadata necessary to restore data (e.g., file objects) for the entire file construction buffer or necessary to restore a maximum amount of data that the file object construction buffer is capable of storing. Thus, the size of the circular log will be at least large enough to restore all file objects and/or data that may be lost due to a power failure, a reboot, or other event that results in loss of content of the file construction buffer.

In embodiments, the file system interface 104 provides a network file system (NFS) mount point for the one or more client devices 112 to access over the network 122. In an embodiment, the file objects 120 correspond to respective files 114 for the network file system and the file objects 120 exist as sequential data structures in a continuous address range of the volatile system memory. Thus, the file system interface 104 and the file-object manager 106 may work in conjunction to provide an interface for clients to perform file system operations on one or more files 114, while the data for the files 114 is stored in the respective file objects 120 in the file object construction buffer 114.

Figure 2:
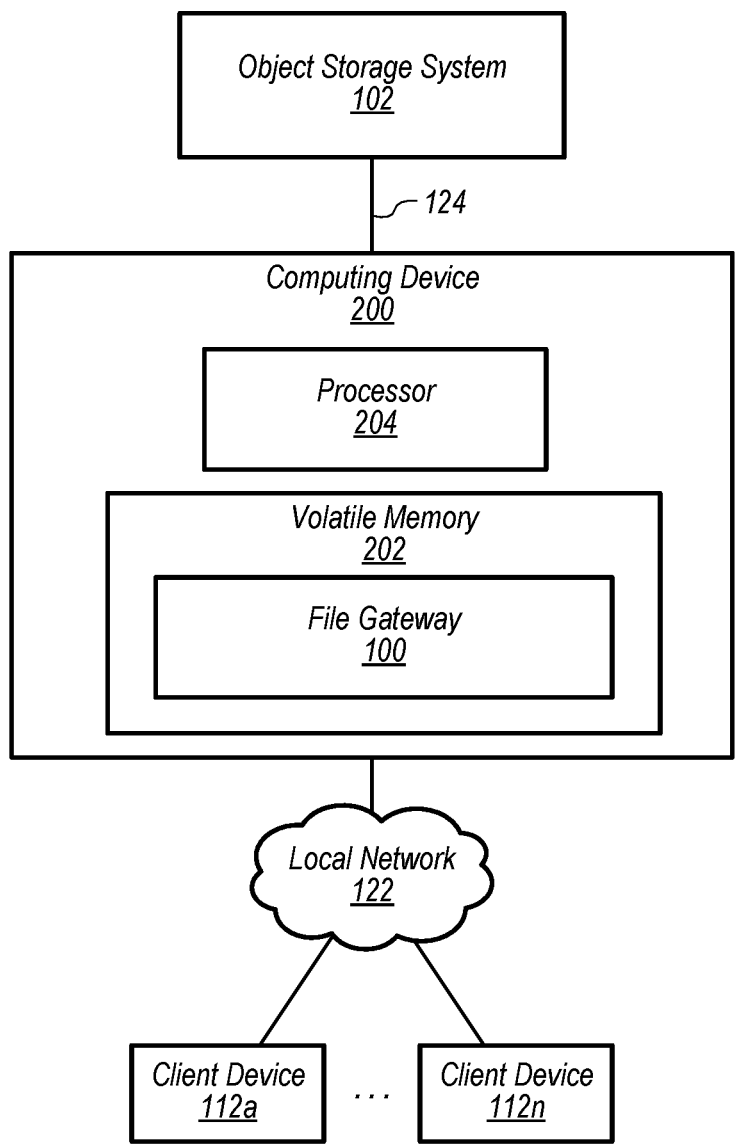
FIG. 2 is a logical block diagram of an object storage system and a computing device hosting a file gateway, according to some embodiments.

FIG. 2 is a logical block diagram of an object storage system and a computing device hosting a file gateway, according to some embodiments. In the depicted embodiment, a computing device 200 hosts the file gateway 100 in a volatile system memory 202 of the computing device 200. As shown, the computing device may also include on or more processors 204.

In embodiments, the computing device 200 may be coupled to the object storage system 102 via the network interface and/or network connection 124. Similarly, the computing device 200 may be coupled to the local network 122 (e.g., client devices 112 or intermediary devices on the local network) via another network interface and/or network connection to allow for communication with the client devices 112.

In an embodiment, one or more of network interfaces of the computing device 200 may be a wireless interface, allowing the computing device 200 to be in part, or completely, electrically and/or physically separate and/or logically separate from the object storage system 102 or the local network 122. In various embodiments, any suitable method for connecting the computing device 200 to the object storage system 102 or the local network 122 may be used, including one or more physical cables or via one or more wireless connections.

The computing device 200 may execute the file gateway 100 or at least a portion of one or more components of the file gateway 100 (e.g., via the processor 204) in the volatile system memory 202. Thus, the computing device 200 may execute application code that implements the file gateway 100 or at least one or more components of the file gateway 100. In embodiments, the volatile system memory 202 comprises operating code for implementing an operating system or any functions associated with an operating system on the computing device 200 (e.g., one or more hypervisors, one or more virtual machines, etc.). In an embodiment, the file gateway 100 comprises one or more applications that include code that can be executed by the processor 204 and/or the operating code.

In some embodiments, the operating code and/or the file gateway 100 may be stored in a persistent data store of the computing device and may begin execution upon booting up, rebooting, or supplying power to the computing device. In embodiments, the operating code and/or the file gateway 100 may be downloaded and/or transferred from the local network 122 or from a wide area network (e.g., from a service provider via the internet) to the computing device 200.

Figure 3:
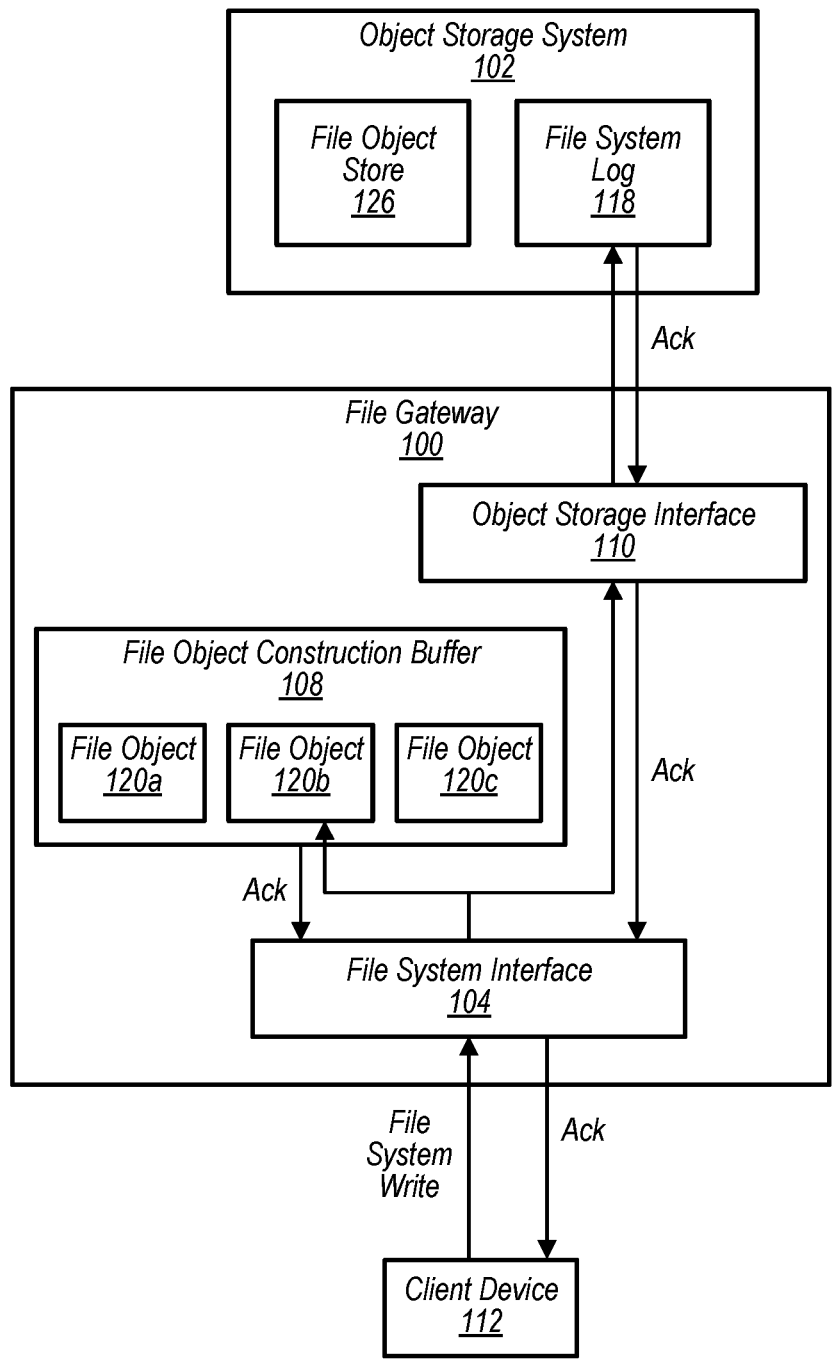
FIG. 3 is a logical block diagram of an object storage system and a file gateway that receives a file system write and provides a write acknowledgment, according to some embodiments.

FIG. 3 is a logical block diagram of an object storage system and a file gateway that receives a file system write and provides a write acknowledgment, according to some embodiments. In the depicted embodiment, a client device 112 transmits a file system write (e.g., via a local network 122) for a file to the file system interface 104. In response to receiving, by the file system interface 104, the file system write for the file, the file-object manager 106 may call the object storage interface 110 to store a log object indicating the file system operation into a file system log in the object storage system 102 and create or update a file object 120b in a file object construction buffer 108 in the volatile system memory (wherein the file object corresponds to the file).

In embodiments, upon creating or updating the file object 120b in the file object construction buffer 108 and receiving an acknowledgment from the object storage interface 110 that a corresponding log object is stored in the file system log of the object storage system 102, the file-object manager 106 may instruct the file system interface 104 to acknowledge to the client 112 that the file system write is complete (e.g., made durable). In some embodiments, in response to determining, by the file-object manager 106, that the file system write is a durable write, then upon the creating or updating of the file object 120b and the receiving of the acknowledgment as described above, the file-object manager 106 instructs the file system interface 104 to acknowledge to the client 112 that the file system write is complete.

In embodiments, the file-object manager 106 may determine that the file system write is a durable write based on an indication that the file system write is a durable write. For example, the file system write may include metadata that indicates the file system write as a durable write. In embodiments, the metadata may be included within the file system write and/or associated with the file system write.

In some embodiments, the file system write may not be a durable write or the file system write may be indicated (e.g., by metadata as above) as a "best effort" write (e.g., no acknowledgment is requested or required by the client). In response to determining, by the file-object manager that the file system write is not a durable write or that the file system write is indicated as a "best effort" write, then file-object manager 106 does not instruct the file system interface 104 to acknowledge to the client 112 that the file system write is complete, even though the file object 120b may be created or updated and the file-object may receive the acknowledgment from the object storage interface 110, as described above.

In various embodiments, if the file gateway receives a file system read for a file, then the file-object manager may first determine whether the file object corresponding to the file exists in the file object construction buffer. If so, then the file-object manager may obtain data corresponding to the read from the file object and then instruct the file system interface to return the obtained data to the client. If not, then the file-object manager may determine if a file object corresponding to the file is in the file object store. If so, then the file-object manager may retrieve, via an application-level network protocol, the file object and load it into the file object construction buffer. As discussed above, the file-object manager may then obtain the read data and cause it to be returned to the client. Thus, the file object construction buffer may serve as a cache for file objects that correspond to respective files. In embodiments, if the file object is not in the file object store, then the file-object manager may indicate that the file does not exist.

Figure 4:
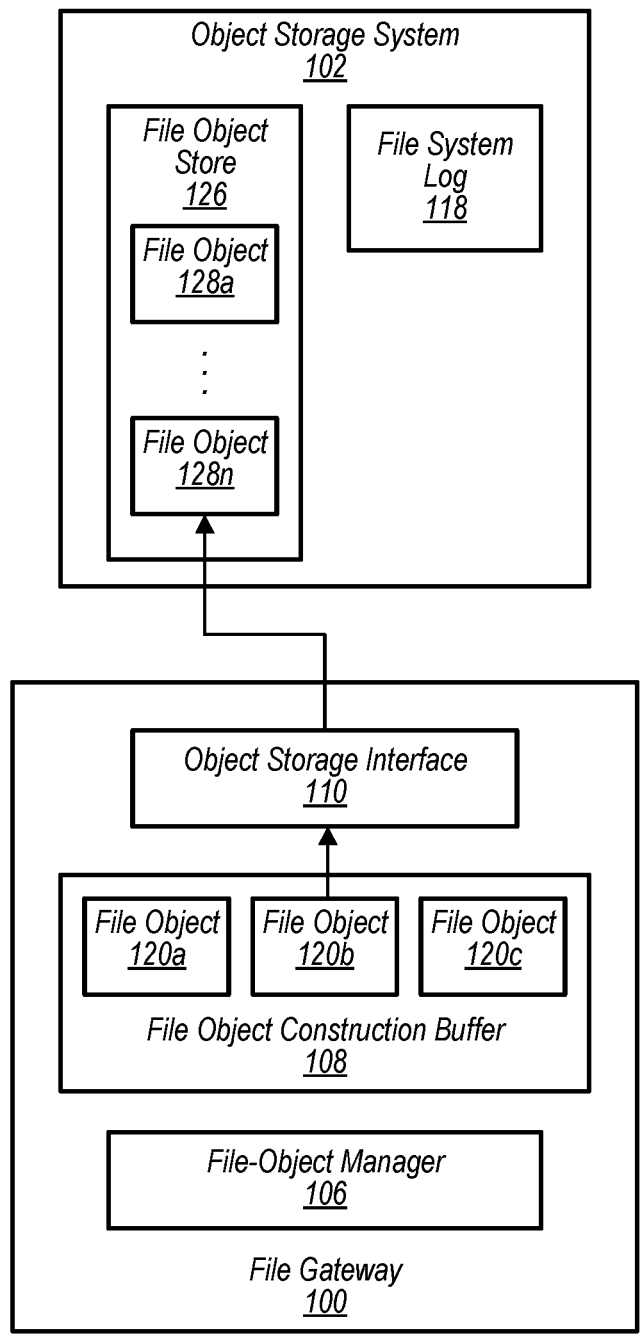
FIG. 4 is a logical block diagram of a file gateway that stores a file object from a file object construction buffer to an object storage system, according to some embodiments.

FIG. 4 is a logical block diagram of a file gateway that stores a file object from a file object construction buffer to an object storage system, according to some embodiments. In the depicted embodiment, the file-object manager 106 determines to evict the file object 120b. In response, the file-object manager 106 may call the object storage interface 110 to store the file object 120b into the file object store 126 in the object storage system 102. As shown, the file object 120b is stored in the file object store 126 as file object 128n.

In some embodiments, the file-object manager 106 may determine, based on one or more eviction criteria being met, to evict the file object 120b. In response, the file-object manager may call the object storage interface 110 to store the file object 120b into the file object store 126 in the object storage system 102.

Examples of eviction criteria are available storage space for objects in the file object construction buffer falling below a threshold value, the file object 120b being the least recently used file object (e.g., the file-object manager least recently added data to the object or least recently modified the object) with respect to all of the file objects in the buffer, the file object 120b being in a group of least recently used file objects in the file object construction buffer (e.g., file object 120b and file object 120c may both be evicted because they are each in a group of least recently used file objects), and receiving an indication from a client or the file gateway 100 to commit the file. In some embodiments, the file-object manager 106 may determine, based on two or more eviction criteria being met, to evict the file object 120b.

Figure 5:
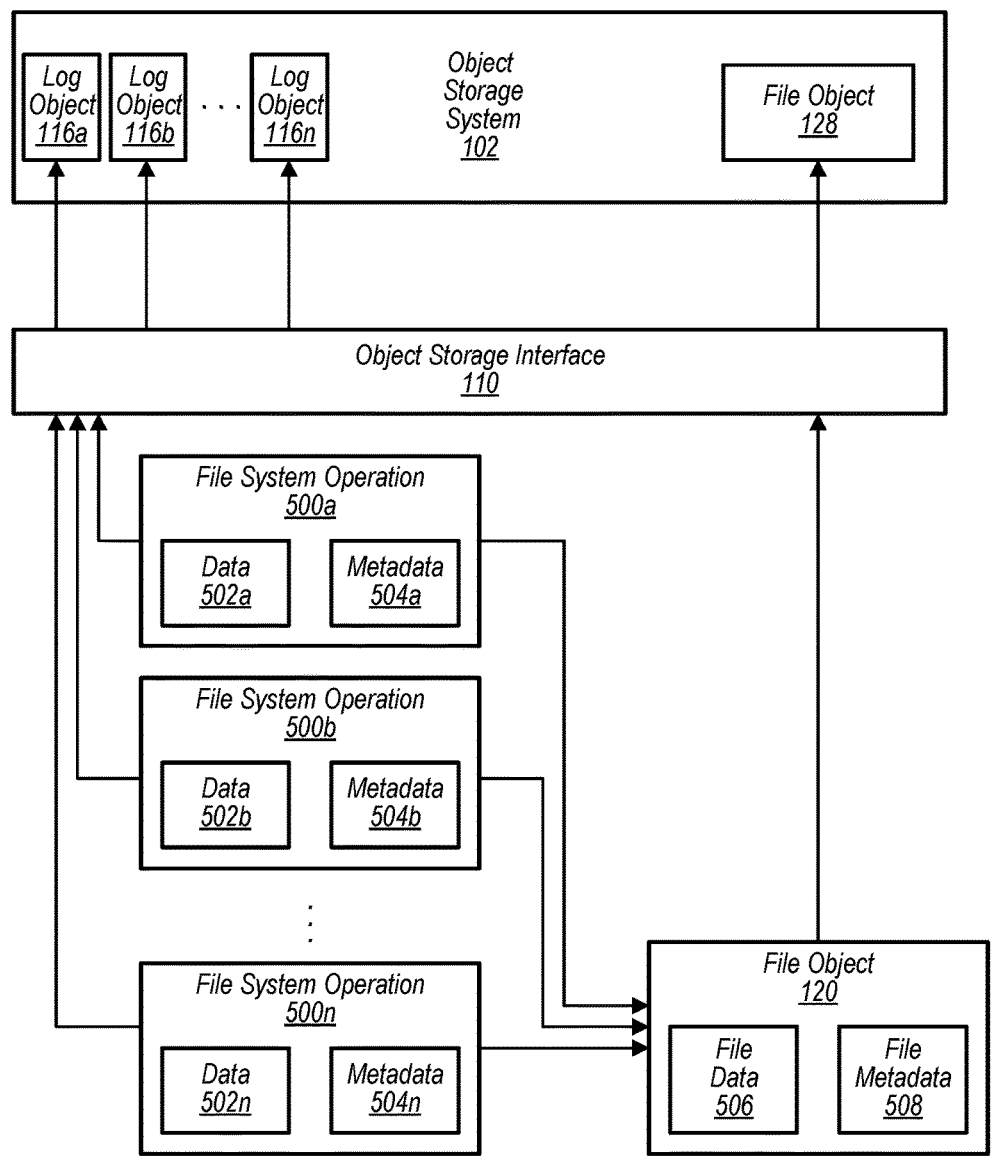
FIG. 5 is a logical block diagram of log objects and a file object that are stored to an object storage system via an object storage interface, according to some embodiments.

FIG. 5 is a logical block diagram of log objects and a file object that are stored to an object storage system via an object storage interface, according to some embodiments. In the depicted embodiment, a series of file system operations 500a-500n are received by the file system interface 104 from one or more clients and directed to a file. Each of the file system operations 500 may include data 502 and metadata 504 for the file. In embodiments, the data 502 may be the data to be stored in the file. The metadata 504 may be any suitable metadata associated with the file system operation, such as an identifier (e.g., name, directory, volume, etc.) for the file, size of the data 502, type of the data 502, etc.

In an embodiment, in response to receiving a file system operation 500 for a file, the file-object manager 106 may call the object storage interface 110 to store a log object 116 indicating the file system operation into a file system log 118 in the object storage system 102 and may create or update a file object 120 in a file object construction buffer 108 in the volatile system memory, wherein the file object 120 corresponds to the file. In embodiments, the file-object manager 106 may construct multiple different log objects over a period of time that each correspond to a respective file system operation. The file-object manager 106 may call the object storage interface 110 to store each of the log objects.

In embodiments, a log object may include some or all of the data 502 and/or metadata 504 for the corresponding file system write. In some embodiments, to update the file object 120, the file-object manager may add data 502 from a file system write to the file data 506. In embodiments, the file metadata 508 may be any suitable metadata associated with the file, the file object 120, and the corresponding file system write 500 as describe above. For example, the file metadata 508 may include an identifier of the file object 120 (e.g., name, etc.), identifier of the file (e.g., name, directory, volume, etc.), size of the data 502, type of the data 502, etc. In embodiments, the file gateway 100 and/or the file-object manager may maintain a mapping (e.g., via a table, list, or other data structure in volatile system memory) of files in the file system interface 104 (or associated file system) to respective file objects in the volatile system memory. For example, the mapping may map identifiers of files to identifiers of file objects.

In the depicted embodiment, the file data 506 includes some or all of the data 502a-502n included in the file system operations 500a-500n and the file metadata 508 includes some or all of the metadata 504a-504n included in the file system operations 500a-500n. As described above, the file-object manager 106 may determine, based on one or more eviction criteria, to evict the file object 120. In response, the file-object manager 106 may call the object storage interface 110 to store the file object 120 into the file object store 126 in the object storage system 102. As shown, the file object 120 is stored in the file object store 126 as file object 128.

Figure 6:
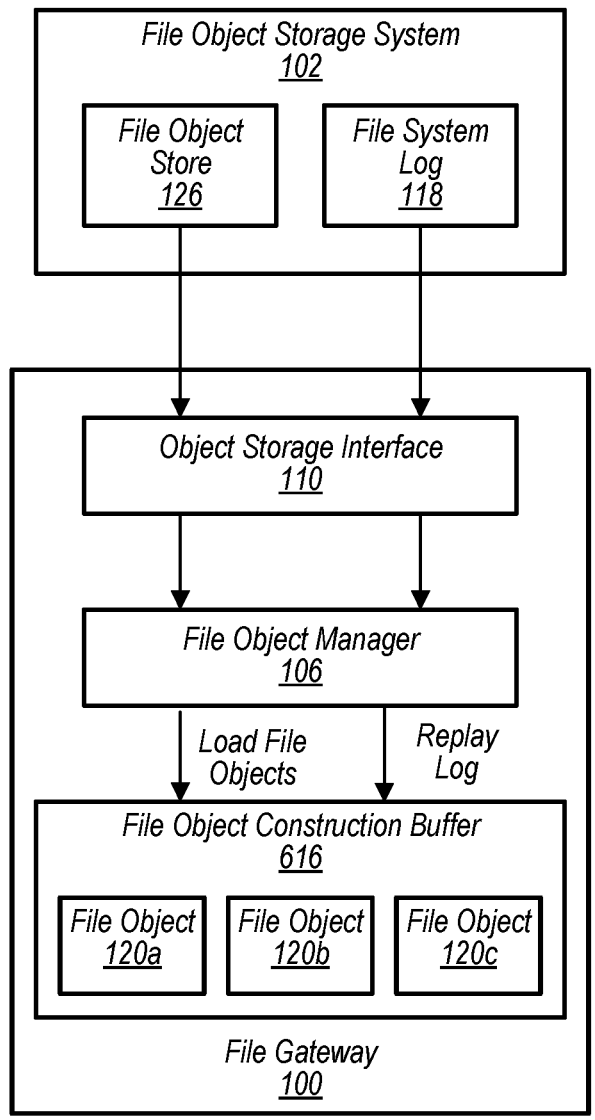
FIG. 6 is a logical block diagram of a file gateway that retrieves one or more log objects from a file system log of a file object storage system and replays one or more file system operations indicated by the one or more log objects to restore one or more file objects in a volatile system memory, according to some embodiments.

FIG. 6 is a logical block diagram of a file gateway that retrieves one or more log objects from a file system log of a file object storage system and replays one or more file system operations indicated by the one or more log objects to restore one or more file objects in a volatile system memory, according to some embodiments. In the depicted embodiment, a reboot, power failure, or other event may have occurred that resulted in loss of some or all of the contents of the volatile system memory of the file gateway. As a result, the file objects that were in the volatile system memory may have been erased/lost.

In embodiments, in response to a reboot, power failure, or other event that results in loss of content stored in the volatile system memory, the file-object manager 106 calls the object storage interface 110 to retrieve one or more log objects from the file system log 118 of the object storage system 102 and replays one or more file system operations indicated by the one or more log objects to restore one or more file objects 120a-120c in the volatile system memory. In some embodiments, the file gateway 100 processes the replaying of the file system operations in the same manner or similar manner as the processing of the file system operations when they were originally received by the file gateway 100 from one or more clients.

For example, the file object manager may replay the file system operations indicated by the log objects in a same sequential order that the file system operations were previously applied to the one or more file objects in the volatile system memory to restore the one or more file objects in the volatile system memory. In embodiments, the file object manager 106 may send the file system operations to the file system interface 104 in the same sequence sequential order that the file system operations were previously received by the file system interface 104 from the one or more clients. In some instances, the file object manager 106 may determine the sequence based on a timestamp, sequence number, or other sequence-related metadata stored within each of the log objects.

After the replaying of the file system operations, the objects in the volatile system memory may be restored to the same state that they were in before the loss of the objects from the reboot, power failure, or other event. For example, the file objects 120a, 120b, and 120c may be restored to their previous state. In response to restoring the objects 120 in the file object construction buffer 114 of the volatile system memory, the file gateway 100 may resume processing one or more additional file system operations received from the one or more clients.

In some embodiments, the one or more additional file system operations may include one or more file system operations that were sent from the one or more clients but not received and/or processed by the file system gateway during a period of time between the loss of content in the volatile system memory and the resumption of processing new file system operations from the one or more clients. For example, file system operations may be stored in a buffer of the computing device 200 or another computing device (e.g., a device of the local network) and replayed or forwarded to the file system interface after the file objects are restored based on the log objects.

Figure 7:
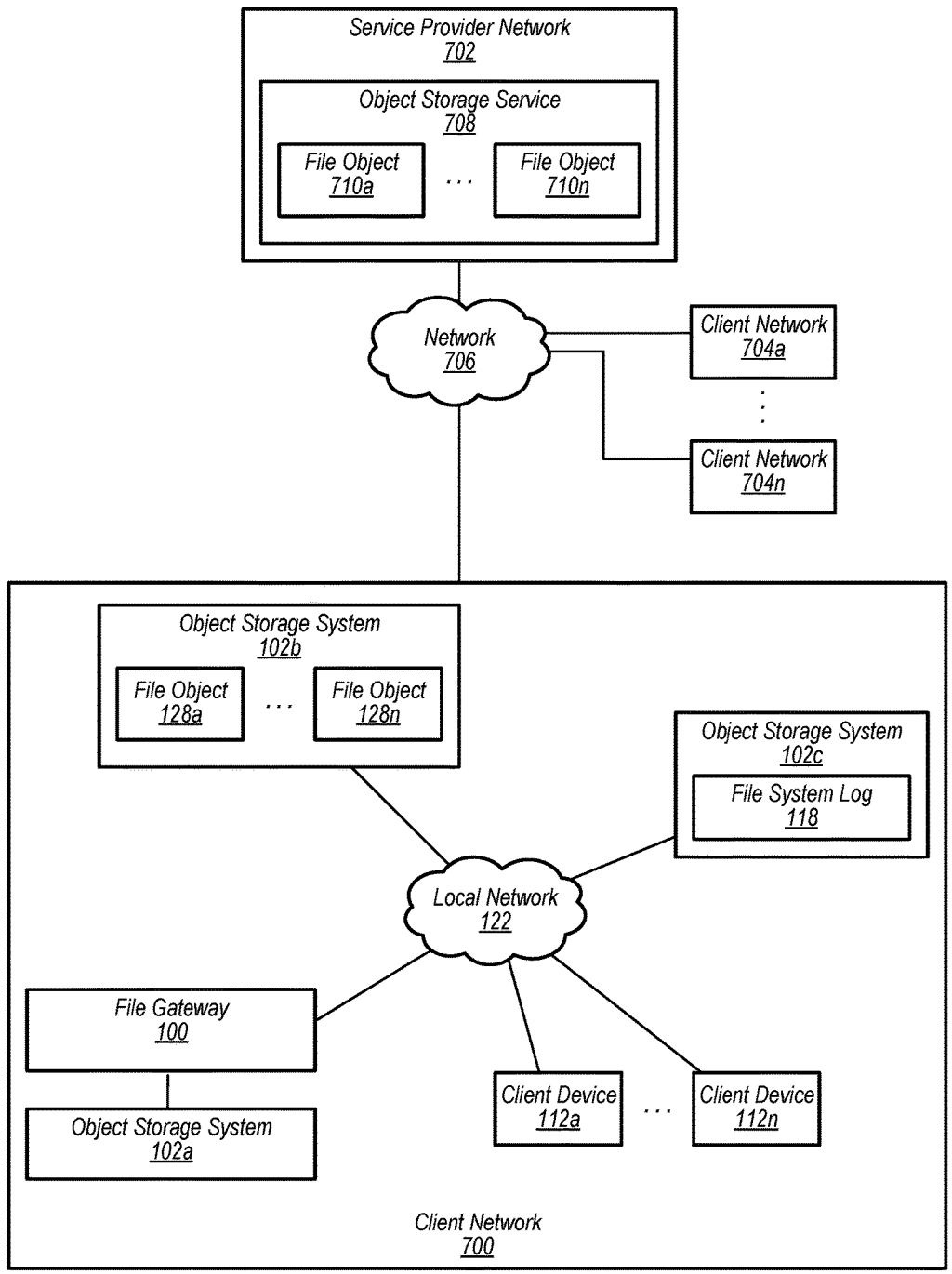
FIG. 7 illustrates a system for using a file system log in an object storage system to provide durability of file objects in volatile system memory, according to some embodiments.

FIG. 7 illustrates a system for using a file system log in an object storage system to provide durability of file objects in volatile system memory, according to some embodiments. In the depicted embodiment, a client network 700 of a client may include a file gateway 100 couple to an object storage system 102a via a local network interface. In an embodiment, the object storage system 102a not directly accessible to any computing devices of the local network 122 of the client other than a device hosting the file gateway 100.

In embodiments, the client network 700 includes the local network 122, which includes various devices attached to the local network 122 that may communicate with each other. The client devices 112, one or more devices hosting the object storage system 102b, and one or more storage devices hosting the object storage system 102c, and one or more devices hosting the file gateway 100 may each be connected, via respective network interfaces, to the local network 122. In the depicted embodiment, the file gateway stores file objects 128a-128n into the object storage system 102b via the local network 122 and stores log objects into the file system log 118 of the object storage system 102c.

In embodiments, at least some of the file objects and/or log objects may instead or in additionally be stored in the object storage system 102a (e.g., as extra backup copies). In some embodiments, at least some of the file objects and/or log objects may be stored in the object storage system 102a and additional/backup copies of the file objects and log objects may be stored in the object storage system 102b and the object storage system 102c, respectively. Moreover, in embodiments, the file gateway 100 may use an object storage interface to store file objects into the object storage system 102b and use a different objet storage interface to store log objects into the object storage system 102c.

In some embodiments, the client network is a client of the service provider network 702. The client network 700 and one or more other client networks 704a-704n may be clients of the service provider network 702 and may be connected to the service provider network via a network 706 (e.g., a wide area network, such as the Internet). Each of the client networks 112n may also include corresponding file gateways, object storage systems, and client devices. Thus, in embodiments, the various descriptions of the client network 112a may also apply to each of the one or more client networks 112n. In embodiments, the wide area network 702 may be one or more networks in between the client network 700 and the service provider network 702 (e.g., the Internet and/or other networks).

The file gateway 100 may use the object storage service 708 in a same or similar way as any of the object storage systems 102a, 102b, 102c. For example, the file gateway 100 may store one or more store objects 710 to an object storage system of the object storage service 708 and/or retrieve one or more objects 710 from the object storage system of the object storage service 708.

In embodiments, the object storage service may include an object storage system, a file gateway, and/or one or more components of the file gateway. In an embodiment, the minimum required size of a log object in the file system log 118 is smaller than a minimum required size of a file object 128. Further, in embodiments, the minimum required size of a file object 128 of the file gateway 100 corresponds to (e.g., is the same as) a minimum required size of a file object 710 for storage in an object storage system of the object storage service 708 of the service provider network 702. In embodiments, a file object in the object construction buffer is allocated the minimum required size assigned to file objects, even though the actual data and/or metadata of the file object is less than the minimum required size. Thus, any storage room of a file object that is not being used by data or metadata of the file object may include "filler" data that is unused and/or is available to store additional data and/or metadata at a later time as the file object grows in size.

As discussed above, in embodiments, the client network 700 may be a network of a client (e.g., customer) of the service provider network 702. For example, copies of at least some of the file objects 128 of the client network 700 may be stored and backed up by the service provider network 8702 on one or more storage devices of networks of the service provider network 702.

In some embodiments, a shippable storage device (e.g., network attached storage device) includes the file gateway 100 and the object storage system 102a. After storing data onto the shippable storage device (e.g., file objects and/or log objects), the client may ship the shippable storage device to the service provider network 702, so the data can be transferred from the shippable storage device to the object storage service 708 of the service provider network 702. In various embodiments, the service provider network 702 may provide one or more different services (e.g., other remote network-accessible services) instead of or in addition to remote data storage. Moreover, in embodiments, the shippable storage device may instead be any other type of device suitable for executing applications and securely storing and/or transporting data.

Figure 8:
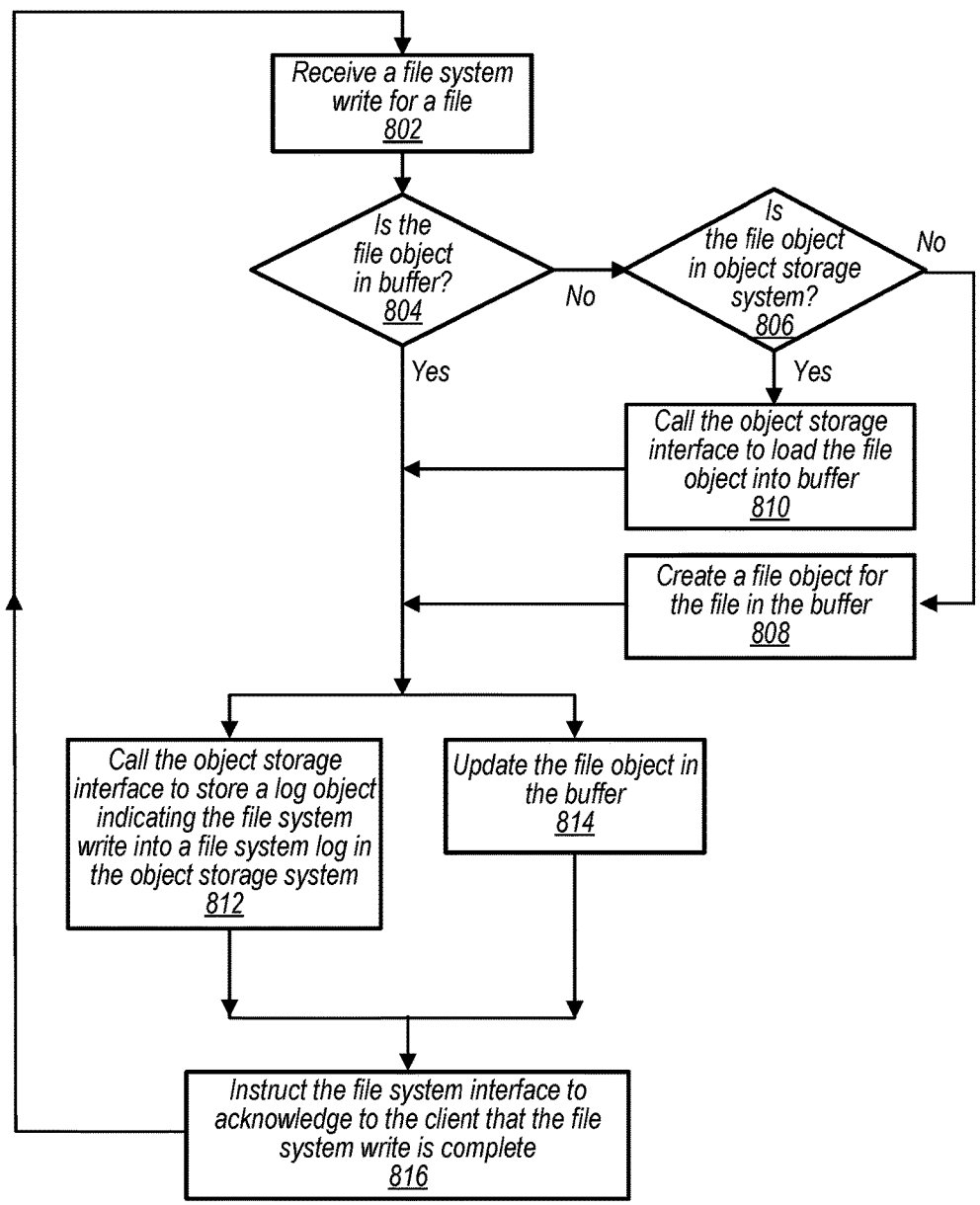
FIG. 8 is a flow diagram of a process for receiving a file system write, storing a log object into a file system log in an object storage system, and updating a file object in a volatile system memory, according to some embodiments.

FIG. 8 is a flow diagram of a process for receiving a file system write, storing a log object into a file system log in an object storage system, and updating a file object in a volatile system memory, according to some embodiments. In embodiments, one or more blocks of FIGS. 8-10 may apply to any type of file system operation (e.g., write, read, copy, delete, open, close, etc.). Similarly, in embodiments, any type of file system operation may apply in FIGS. 1-7 above.

At block 802, the file system interface 104 receives a file system write for a file. At block 804, the file-object manager 106 determines whether a file object corresponding to the file is in the file objet construction buffer. If not, then at block 806 the file-object manager 106 determines whether a file object corresponding to the file is stored in the object storage system. If not, then at bock 808 the file-object manager 106 creates a file object for the file in the buffer (e.g., a file object that corresponds to the file). In embodiments, file-object manager 106 may send the indication to the client or to the file system interface 104 and the file system interface 104 may send the indication to the client.

However, if the file-object manager 106 determines, at block 806, that the file object corresponding to the file is stored in the objet storage system, then at block 810, the file-object manager 106 calls the object storage interface to load the file object corresponding to the file into the file object construction buffer. The process may then proceed to both blocks 812 and 814, as discussed below.

Returning to block 804, if the file-object manager 106 determines that the file object corresponding to the file is in the file objet construction buffer, then the process performs both blocks 812 and 814. At block 812, the file-object manager 106 calls the object storage interface to store a log object indicating the file system write into a file system log in the object storage system. At block 814, the file-object manager 106 updates the file object in the file object construction buffer. In embodiments, the file object may receive multiple updates over a period of time, before the file object is finally evicted (e.g., stored into the object storage system). Thus, the file object may grow to a relatively large size before finally being evicted.

In response to determining, by the file-object manager 106, that both block 812 and 814 have been performed, the file-object manager 106 instructs the file system interface 104 to acknowledge to the client that the file system write is complete. The process then returns to block 802.

In some embodiments, the file-object manager 106 does not instruct the file system interface 104 to acknowledge to the client that the file system write is complete unless the file system write indicates that the write is a durable write. Therefore, in some embodiments, after block 812 and/or block 814 is performed, the process returns to block 802.

Figure 9:
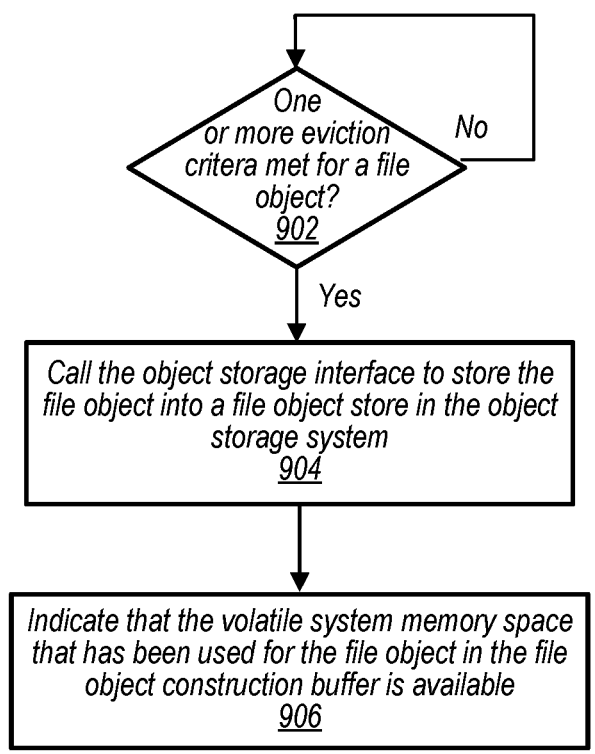
FIG. 9 is a flow diagram of a process for evicting a file object from a volatile system memory, according to some embodiments.

FIG. 9 is a flow diagram of a process for evicting a file object from a volatile system memory, according to some embodiments. At block 902, the file-object manager 106 determines whether one or more eviction criteria are met for a file object to be evicted from the volatile system memory. If not, then the process returns to block 902.

If the file-object manager 106 determines that one or more eviction criteria are met for the file, then at block 904, the file-object manager 106 calls the object storage interface to store the file object into a file object store in the object storage system. At block 906, the file-object manager 106 indicates that the volatile system memory space that has been used for the file object in the file object construction buffer is available. For example, the file-object manager 106 may store, in the file object construction buffer and/or the volatile system memory, an indication that the volatile system memory space that has been used for the file object in the file object construction buffer is available. In embodiments, the indication may be a flag that is set, one or more bits that are set, or indication stored in the volatile system memory.

Figure 10:
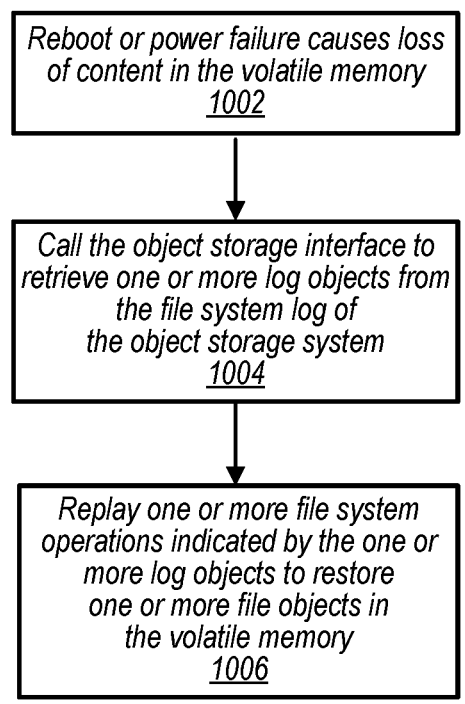
FIG. 10 is a flow diagram of a process for retrieving one or more log objects from a file system log of a file object storage system and replaying one or more file system operations indicated by the one or more log objects to restore one or more file objects in a volatile system memory, according to some embodiments.

FIG. 10 is a flow diagram of a process for retrieving one or more log objects from a file system log of a file object storage system and replaying one or more file system operations indicated by the one or more log objects to restore one or more file objects in a volatile system memory, according to some embodiments. At block 1002, a reboot, power failure, or other event occurs that causes loss of content in the volatile system memory (e.g., some or all of the file object stored in the file construction buffer of the volatile system memory).

At block 1004, the file-object manager 106 calls call the object storage interface to retrieve one or more log objects from the file system log of the object storage system. At block 1006, the file-object manager 106 replays one or more file system operations indicated by the one or more log objects to restore one or more file objects in the volatile system memory.

Figure 11:
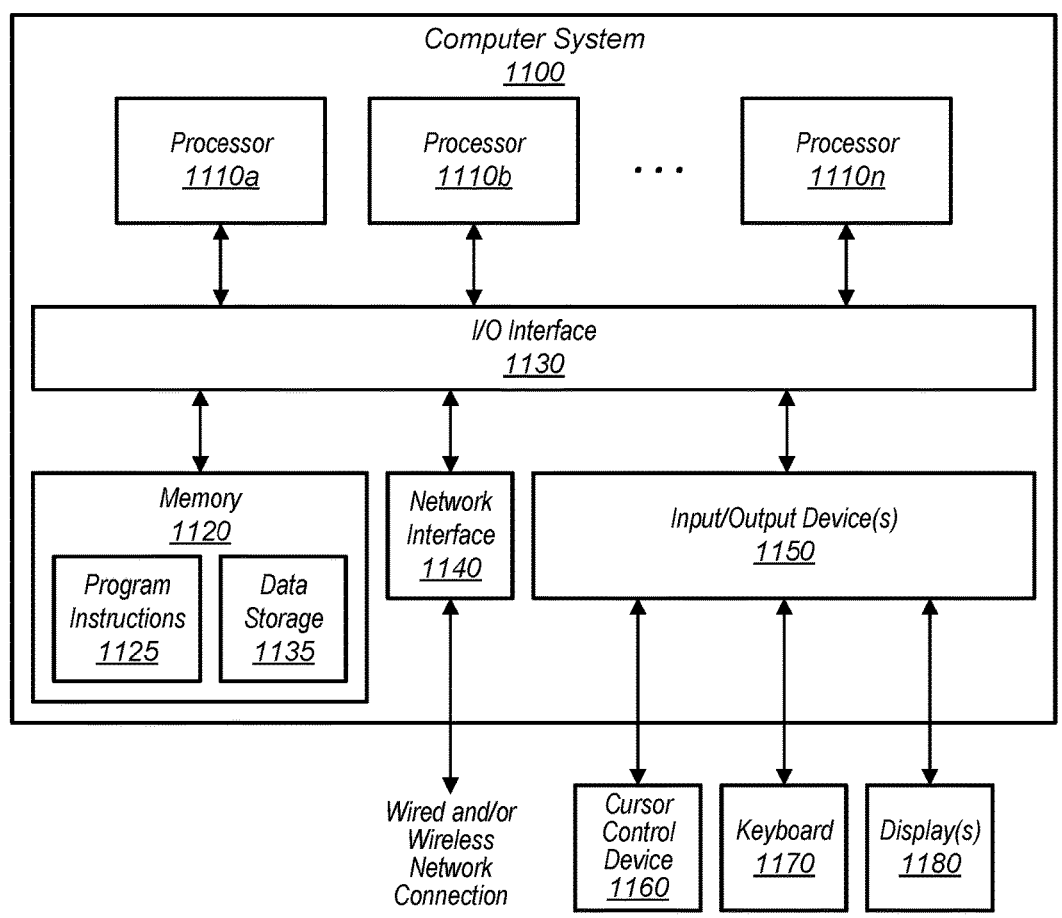
FIG. 11 is a block diagram illustrating an example computer system that implements some or all of the techniques described herein, according to some embodiments.

Any of various computer systems may be configured to implement processes associated with a shippable storage device 100. For example, FIG. 11 is a block diagram illustrating an example computer system that implements some or all of the techniques described herein, according to some embodiments. In various embodiments, the service provider network 702 and/or the client network 700 may each include one or more computer systems 1100 such as that illustrated in FIG. 11. In embodiments, the shippable storage device described in FIG. 7 may include one or more components of the computer system 1100 that function in a same or similar way as described for the computer system 1100.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be embedded processors implementing any of a variety of instruction set architectures (ISAs), such as the x106, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the file gateway, object storage system, client devices, or service provider are shown stored within system memory 1120 as program instructions 1125. In some embodiments, system memory 1120 may include data 1135 which may be configured as described herein (e.g., file objects, log objects, etc.).

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as between the shippable storage device 100 and other computer systems, for example. In particular, network interface 1140 may be configured to allow communication between computer system 1100 and/or various I/O devices 1150. I/O devices 1150 may include scanning devices, display devices, input devices and/or other communication devices, as described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In some embodiments, I/O devices 1150 may be relatively simple or "thin" client devices. For example, I/O devices 1150 may be configured as dumb terminals with display, data entry and communications capabilities, but otherwise little computational functionality. However, in some embodiments, I/O devices 1150 may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices 1150 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 1150 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device 1150 (e.g., cursor control device 1160, keyboard 1170, or display(s) 1180 may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
an object storage system configured to store data objects via an application-level network protocol; and
a file gateway implemented by one or more computing devices comprising one or more processors and volatile system memory, wherein the file gateway comprises:
a file system interface configured to receive, from one or more clients over a network, file system operations;
an object storage interface configured to store data objects to the object storage system via the application-level network protocol; and
a file-object manager configured to:
in response to receiving by the file system interface a file system operation for a file:
call the object storage interface to store a log object into a file system log in the object storage system, wherein the log object indicates the file system operation for the file; and
create or update, based on the file system operation for the file, a file object in a file object construction buffer in the volatile system memory, wherein the file object corresponds to the file, and wherein the file-object manager does not have access to local persistent storage; and
in response to a determination to evict the file object, call the object storage interface to store the file object into a file object store in the object storage system.

2. The system as recited in claim 1, wherein the file-object manager is configured to:
in response to a reboot or power failure that results in loss of content stored in the volatile system memory:
call the object storage interface to retrieve one or more log objects from the file system log of the object storage system; and
replay one or more file system operations indicated by the one or more log objects to restore one or more file objects in the volatile system memory.

3. The system as recited in claim 1, wherein, for a file system write received from a client, the file-object manager is configured to:
upon creating or updating a corresponding file object in the file object construction buffer and receiving an acknowledgment from the object storage interface that a corresponding log object is stored in the file system log of the object storage system, instruct the file system interface to acknowledge to the client that the file system write is complete.

4. The system as recited in claim 1, wherein to determine to evict the file object, the file-object manager is configured to determine that one or more eviction criteria for the particular file object are met, and wherein the one or more eviction criteria comprises at least one of:
available storage space for objects in the file object construction buffer falling below a threshold value, or
the file object being the least recently used file object or being in a group of least recently used file objects in the file object construction buffer, or
receiving an indication to commit the file.

5. The system as recited in claim 1, wherein the file system interface is configured to:
provide a network file system mount point for the one or more clients to access over the network, wherein file objects that correspond to respective files for the network file system exist as sequential data structures in a continuous address range of the volatile system memory.

6. A method, comprising:
performing, by one or more computing devices:
receiving, via a file system interface, file system operations from one or more clients over a network; and
in response to receiving, via the file system interface, a file system operation for a file:
calling, by a file-object manager, an object storage interface to store a log object into a file system log in an object storage system, wherein the log object indicates the file system operation for the file; and
creating or updating, based on the file system operation for the file, a file object in a file object construction buffer in a volatile system memory, wherein the file object corresponds to the file.

7. The method as recited in claim 6, wherein the file-object manager does not have access to local persistent storage and the object storage interface stores the log object to the file system log in the object storage system via an application-level network protocol.

8. The method as recited in claim 6, further comprising:
in response to a reboot or power failure that results in loss of content stored in the volatile system memory:
calling, by a file-object manager, the object storage interface to retrieve, via an application-level network protocol, log objects from the file system log of the object storage system; and
replaying, by a file-object manager, file system operations indicated by the log objects in a same sequential order that the file system operations were previously applied to one or more file objects in the volatile system memory to restore the one or more file objects in the volatile system memory.

9. The method as recited in claim 6, further comprising:
for a file system read received from a client:
determining, by the file-object manager, whether a particular file object corresponding to the file system read exists in the file object construction buffer in the volatile system memory; and
in response to determining, by the file-object manager, that the particular file object corresponding to the file system does not exist in the file object construction buffer in the volatile system memory:
calling the object storage interface to retrieve, via an application-level network protocol, the particular file object from the file object store in the object storage system; and
loading the particular file object into the file object construction buffer in the volatile system memory.

10. The method as recited in claim 6, wherein a minimum required size of the log object is smaller than a minimum required size of the file object.

11. The method as recited in claim 10, wherein the minimum required size of the file object corresponds to a minimum required size of a given file object for storage in an object storage service of a service provider network.

12. The method as recited in claim 6, further comprising:
determining, by the file-object manager, that one or more eviction criteria are met to evict the file object; and
in response to determining that the one or more eviction criteria are met, calling, by the file-object manager, the object storage interface to store, via an application-level network protocol, the file object into a file object store in the object storage system.

13. The method as recited in claim 6, further comprising:
for a file system write received from a client:
in response to determining, by the file-object manager, that the file system write is a durable write:
upon creating or updating a corresponding file object in the file object construction buffer and receiving an acknowledgment from the object storage interface that a corresponding log object is stored in the file system log of the object storage system, instructing, by the file-object manager, the file system interface to acknowledge to the client that the file system write is complete.

14. A non-transitory computer-readable storage medium storing program instructions that, when executed by a computing device, cause the computing device to implement:
receiving, via a file system interface, file system operations from one or more clients over a network; and in response to receiving, via the file system interface, a file system operation for a file:
- calling, by a file-object manager, an object storage interface to store a log object into a file system log in an object storage system, wherein the log object indicates the file system operation for the file; and
- creating or updating, based on the file system operation for the file, a file object in a file object construction buffer in a volatile system memory, wherein the file object corresponds to the file.

15. The non-transitory, computer-readable storage medium of claim 14, wherein the file-object manager does not have access to local persistent storage and the object storage interface stores the log object to the file system log in the object storage system via an application-level network protocol.

16. The non-transitory, computer-readable storage medium of claim 14, wherein the program instructions cause the computing device to implement:
in response to a reboot or power failure that results in loss of content stored in the volatile system memory:
- calling, by a file-object manager, the object storage interface to retrieve, via an application-level network protocol, log objects from the file system log of the object storage system; and
- replaying, by a file-object manager, file system operations indicated by the log objects in a same sequential order that the file system operations were previously applied to one or more file objects in the volatile system memory to restore the one or more file objects in the volatile system memory.

17. The non-transitory, computer-readable storage medium of claim 14, wherein the program instructions cause the computing device to implement:
- determining, by the file-object manager, that one or more eviction criteria are met to evict the file object; and
- in response to determining that the one or more eviction criteria are met, calling, by the file-object manager, the object storage interface to store the file object into a file object store in the object storage system.

18. The non-transitory, computer-readable storage medium of claim 17, wherein the one or more eviction criteria comprises at least one of:
- available storage space for objects in the file object construction buffer falling below a threshold value, or
- the file object being the least recently used file object or being in a group of least recently used file objects in the file object construction buffer, or
- receiving an indication to commit the file.

19. The non-transitory, computer-readable storage medium of claim 14, wherein the program instructions cause the computing device to implement:
for a file system write received from a client:
upon creating or updating a corresponding file object in the file object construction buffer and receiving an acknowledgment from the object storage interface that a corresponding log object is stored in the file system log of the object storage system, instructing, by the file-object manager, the file system interface to acknowledge to the client that the file system write is complete.

20. The non-transitory, computer-readable storage medium of claim 19, wherein the file system write is indicated as a durable write.

\* \* \* \* \*